Figure 1:
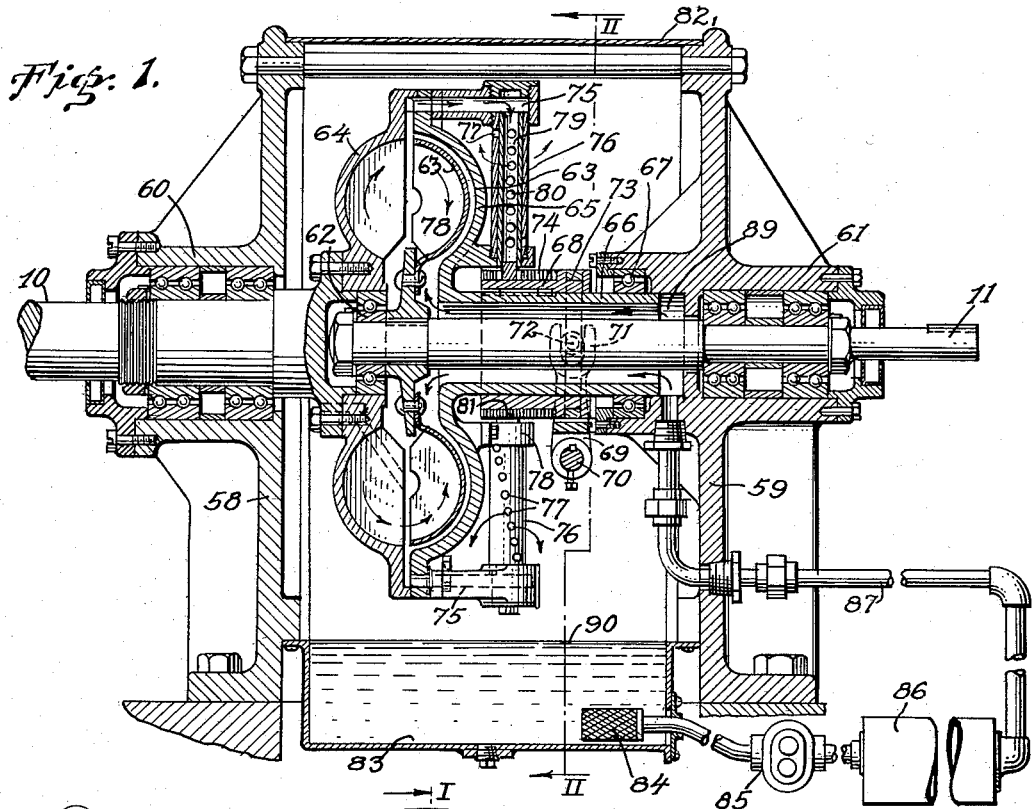

Sept. 27, 1955

C. A. ODING 2,718,760

VARIABLE SPEED ROTARY FLUID COUPLING

Original Filed April 28, 1947

2 Sheets-Sheet 1

INVENTOR.
CARL A. ODING.
BY
Wm. H. Atkinson
ATTORNEY.

Sept. 27, 1955        C. A. ODING        2,718,760
VARIABLE SPEED ROTARY FLUID COUPLING
Original Filed April 28, 1947        2 Sheets—Sheet 2
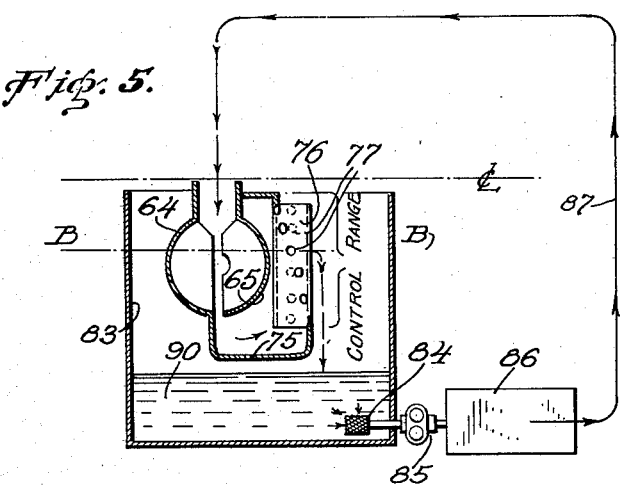
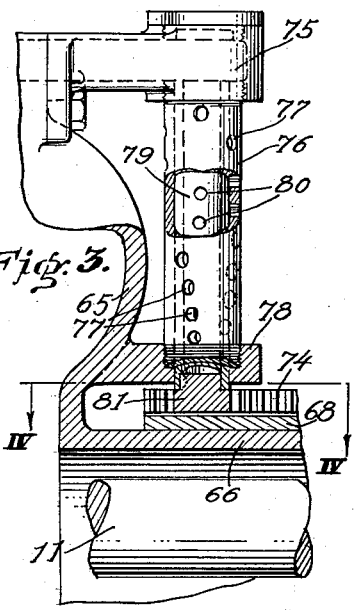
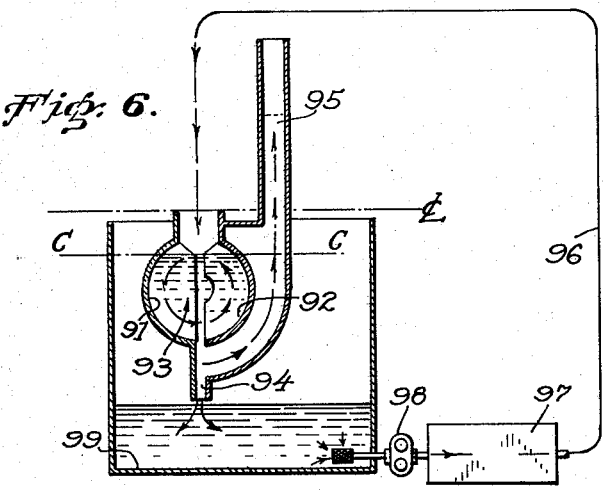
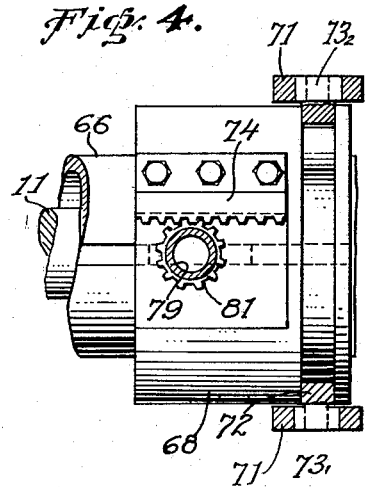
INVENTOR.
CARL A. ODING.
BY
ATTORNEY.

United States Patent Office 2,718,760
Patented Sept. 27, 1955

2,718,760

VARIABLE SPEED ROTARY FLUID COUPLING

Carl A. Oding, Alameda, Calif., assignor to Planamatic Corporation, Oakland, Calif., a corporation of California Original application April 28, 1947, Serial No. 744,385, now Patent No. 2,649,690, dated August 25, 1953. Divided and this application May 8, 1952, Serial No. 286,849

6 Claims. (Cl. 60—54)

The present invention relates to hydraulic couplings of the kinetic energy type, in which a driving member and a driven member are so constructed and juxtaposed that an energy transmitting fluid will circulate therebetween in a vortex ring and more particularly to an improved type of fluid coupling or clutch having means by which the quantity of fluid in circulation between its driving and driven members may be varied to control the slip, torque and/or speed transmitting characteristics of the coupling.

This application is a division of my earlier filed application, Serial No. 744,385 filed April 28, 1947, now Pat. No. 2,649,690, issued August 25, 1953, and entitled: Variable Speed Rotary Fluid Coupling.

It is sometimes desirable in a coupling of this type to selectively control the operating characteristics thereof. This is generally accomplished by varying the amount of liquid in the vortex or working chamber formed between the driving and driven members of the coupling.

At the present time there are several methods by which this result can be obtained. The most common procedure is to permit the escape of oil through a constricted outlet at the perimeter of the vortex chamber and then regulate the flow of a fluid thereto by a variable pumping means which will compensate for this loss of fluid and thus maintain a desired level of fluid in the vortex chamber. In another arrangement where the flow of fluid is maintained at a rate which will more than compensate for any loss of fluid at the perimeter of the vortex ring there is provided a scoop-like discharge outlet which may be regulated to extract fluid from the vortex supporting chamber whenever fluid in an excess of that which is required will be directed out of the vortex chamber. Normally couplings of this type are operated with the vortex chamber completely filled but where a difference in speed between the driving and driven members becomes important as in connecting a load to a source of power and/or for the purpose of maintaining a difference in speed between the driving and driven members, these couplings may be operated with the vortex chamber only partially filled. Under these conditions the amount of operating fluid in the vortex chamber will determine the slip that will prevail between the driving and driven members. In other words, as the operating fluid is withdrawn from the vortex chamber the slip between the driving and driven members will increase. By the same token, as the vortex chamber is filled up the driving and driven members will come into rotation at more nearly the same speeds. In a good coupling under full load conditions and with the vortex chamber completely filled, the normal slip will very rarely exceed 2%.

The principal object of my present invention is to provide a fluid clutch or coupling of the fluid vortex type which may be operated efficiently for long periods as a speed reducing unit without overheating which is the major fault in like couplings of the prior art.

Another object of the invention is to provide a new and novel arrangement by which any desired or predetermined level of operating fluid may be maintained in the vortex chamber of the coupling independently of the rate of flow of said fluid to and therefrom.

Another object of the invention is to provide a novel form of centrifugally operated fluid discharge means for the vortex chamber of a fluid coupling by which any predetermined level of operating fluid may be maintained in the vortex chamber of the coupling without interfering with the free circulation of the operating fluid therethrough.

Another object of the invention is to provide an improvement in a coupling of the Föttinger type which will permit a manual adjustment of the slip between the vortex chamber forming members of the coupling while in operation and entirely independently of the flow of the working fluid through the coupling.

Another object of the invention is to provide an arrangement for the control of the fluid level in a coupling of the vortex chamber type as herein contemplated, which will permit of a rapid change and/or a continued operation at a reduced output speed without overheating.

A further object of the invention is to provide an improved arrangement wherein all the objects and advantages hereinbefore set forth are obtained in a fluid coupling of the so called vortex chamber type without the use of a fluid scooping device such as is now more generally employed for maintaining a desired level of operating fluid within the vortex chamber of the coupling.

The foregoing and other objects of the invention, which will be apparent to those skilled in the art, are attained by means of a novel combination and arrangement of parts to be hereinafter described and claimed, and in order that the same may be better understood, reference is had to the accompanying drawings which illustrate the now preferred forms of the invention. It is to be understood, however, that the inventive conception is capable of many other mechanical expressions within the scope of the subject matter claimed hereinafter.

In the drawing—

Figure 2:
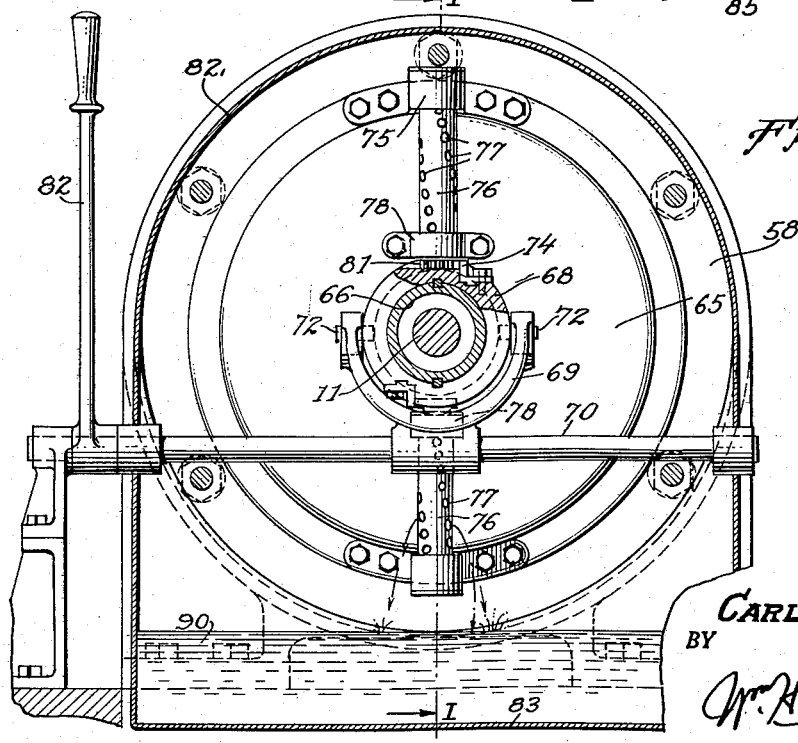

Figure 1, is a vertical sectional view of a coupling constructed in accordance with the particular embodiment of my invention as divided out of my said earlier application, Serial No. 744,385, now Patent No. 2,649,690, taken along line I—I of Figure 2, Figure 2 is an end view of the coupling shown in Figure 1, taken along line II—II of Figure 1, Figures 3 and 4 are enlarged fragmentary views showing details of the fluid controlling valve means employed by this embodiment of my invention, Figure 5 is a diagrammatic view illustrating the principle upon which the present embodiment of the invention operates, and Figure 6 is a diagrammatic view illustrating the principle of operation in a prior art arrangement without a scoop tube.

The major problem in operating a fluid clutch or coupling of the hydraulic type such as is here contemplated under conditions involving excessive slips is to provide a means for preventing an overheating of the operating fluid. With the prior art methods this problem is difficult of solution for the reason that the circulation of fluid through the coupling is limited by the restricted fluid outlet means through which the operating fluid escapes or is withdrawn from the vortex chamber. In accordance with my present invention, this difficulty is overcome by providing for a free discharge of the operating fluid from the vortex chamber in such a manner that the level of fluid in the vortex chamber may be maintained constant at all times irrespective of the rate of flow of the operating fluid into the vortex chamber. Briefly this is accomplished by providing a means that will form an outlet at the perimeter of the vortex chamber which will discharge the fluid inwardly at a point nearer the axis of rotation of the driving and driven members and within the radial limits of the vortex chamber formed between the driving and driven members.

This in effect provides what may be termed a centrifugally operated fluid trap in which the trapped fluid will establish a counter-balancing column of fluid externally of the vortex chamber of the coupling which will determine the level or amount of operating fluid that will remain or be maintained in the vortex chamber of the coupling independently of the rate of flow or quantity of fluid introduced into the vortex chamber from the source of fluid supply.

In Figures 1 and 2 of the drawings a driving shaft 10 and a driven shaft 11 are shown as juxtaposed within an enclosing housing similar to that described in my parent application and which is formed by end plates 58 and 59 that carry suitable shaft supporting bearings 60 and 61. At their meeting ends the shafts 10 and 11 are also held in alignment by means of a suitable telescoping bearing 62. In this particular arrangement a driving member 64 is carried by the driving shaft 10 and the driven shaft 11 carries a secondary or driven member 63. The driving member 64 also carries an inwardly extending and overlapping portion 65 that is adapted to surround the driven member 63 and at its inner edge this portion 65 also has a cylindrical collar or sleeve 66 which is disposed in spaced concentric relation to the driven shaft 11 and there supported by a suitable bearing 67. Mounted upon the cylindrical collar 66 there is also an axially slidable sleeve 68 which is adapted to be moved for a limited distance along the cylindrical collar 66 by means of a yoke-like lever arm 69 which is keyed upon a transversely extending shaft 70. Forked ends 71 of the lever arm 69 are also here shown as engageable with oppositely extending pins 72 that are carried by a freely rotatable ring 73 which is recessed within an annular groove formed upon the outer end of the slidable sleeve 68. The slidable sleeve 68 also carries two axially extending rack gears 74 which, as will hereinafter appear, operate to control the discharge of fluid from the vortex chamber formed by the driving and driven members 64 and 63. In this particular embodiment of the invention the driving member 64 is provided with an axially extending conduit 75 which connects at one end with the space at the perimeter of the vortex chamber. At its other end the conduit 75 is provided with a radially disposed and inwardly extending valve member 76 which is in the form of a spirally perforated conduit with ports 77. This valve member or radially extending conduit 76 with its ports 77 is supported in a fixed position at its outer end by the conduit 75 and at its inner end there is a bracket 78 which extends outwardly from the overlapping portion 65 of the driving member 64 at a point closely adjacent the rack gear 74 carried by the slidable sleeve 68. Disposed within the spirally perforated valve member or conduit 76 and rotatable with respect thereto there is a tubular valve member 79 which carries a plurality of apertures or perforations 80 that are arranged in a straight line and which are adapted to be successively brought into register with the spirally arranged ports 77 of the spirally perforated valve member 76. This tubular valve member 79 is here shown as adapted to be rotated within the spirally perforated conduit 76 by means of a pinion gear 81 which is fixed upon the lower end thereof where it will mesh with the rack gear 74 upon the slidable sleeve 68. With this particular arrangement of ports and apertures upon the valve member or conduit 76 and the tubular valve member 79 it is contemplated that as the tubular valve member 79 is turned within the conduit 76 the perforations 80 and the ports 77 will come into register progressively in a direction leading from the conduit 76 and toward the axis about which the coupling is operating. As more clearly shown in Figure 2 of the drawings the yoke-like lever arm 69 is adapted to be moved by a manually operated lever arm 82 that is keyed upon the shaft 70 externally of the housing within which the coupling is disposed. From this it will be understood that when the manually operated lever 82 is rocked from one position to another the slidable sleeve 68 will be correspondingly moved. This will cause the rack gear 74 carried thereby to rotate the pinions 81 and thus cause the tubular valve member 79 to turn within the stationary valve member 76 and thus progressively bring its ports 80 into register with the ports 77 and provide a discharge outlet for the conduit 75 which will progress inwardly within the limits of the vortex chamber as will be determined by the degree of rotation of the tubular valve member 79. In this manner as the ports 77 of the stationary valve member 76 are successively opened by rotation of the tubular valve member 79 there will be provided a discharge outlet the position of which will be determined by the particular port which is opened and through which the circulating fluid passing through the vortex chamber is centrifugally discharged. In other words, the particular port 77 of the valve member 76 which is opened in this manner will provide a weir-like overflow outlet through which all fluid in excess of the level thus established in the vortex chamber may spill over or flow by centrifugal force. At this point it should be added that while the ports 77 and the perforations 80 are here shown as of relatively small diameter these may be greatly enlarged if a fine adjustment of the discharge flow is required. While the valve member 76 and the tubular valve member 79 are shown as having two sets of ports and perforations it will also be understood that, if desired, only one series of such ports or perforations may be provided on these numbers. The end plates 58 and 59 of the housing carry an encircling shroud 82 which serves to confine the operating fluid and cause it to collect in a reservoir 83 at the lower part thereof. Within this reservoir 83 there is a strainer 84 through which the operating fluid is withdrawn by a pump 85 and then circulated to a cooler 86 from which it will be delivered by means of a pipe connection 87 to a chamber 89 that extends around the driven shaft 11 at the outer end of the cylindrical collar 66. In this manner the operating fluid designated by the numeral 90 may be caused to recirculate from the reservoir 83 and along the driven shaft 11 to the interior of the vortex chamber of the coupling.

By referring to Figure 3 of the drawings it will be noted that the two series of ports 77 which are arranged spirally upon the stationary valve member 76 are staggered vertically with respect to each other in each series so that with such an arrangement and the series of ports 80 of the tubular valve member 79 similarly staggered it will be seen that the discharge outlet through the conduit 76 may be varied in a substantially continuous manner or in small increments. In other words, with this arrangement the level of fluid discharge, when operating fully through one of the open ports 77 will be transferred to a subsequent port 77 of the other series upon a slight additional rotation of the tubular valve member 79 and in this way a very fine adjustment of the fluid level within the vortex chamber will be possible.

As is more clearly shown in Figure 4 of the drawings the rack 74 is positioned slightly off center so that the pinion 81 will operate about a center that is radial to the axis of rotation of the coupling member. It is believed that with these further detailed showings the construction of this latter form of discharge conduit will be fully understood.

For a description of the operation as described above, reference is now made to Figures 5 and 6 of the drawings which diagrammatically illustrate the principles that are involved. In these diagrams there is shown a static representation of the lower half of the vortex chamber of a coupling. While the elements, as here shown, are static with the various levels of fluid indicated by a horizontal line it will be understood that in operation these levels will be comparable to the inner surface of the fluid which will be maintained by centrifugal force when the coupling is operating. An advantage of this particular arrangement over the prior art methods of control is that it will permit the maintenance of any predetermined level of operating fluid within the vortex chamber irrespective of the rate of flow of the operating fluid therethrough. With this it will be also seen that the operating fluid may be circulated, cooled and recirculated through the vortex chamber with a continuous and constant rate of flow. At the same time, should the flow of fluid be temporarily discontinued for any reason the coupling will still operate with the particular level of fluid within the vortex chamber for which the discharge conduit is adjusted. For some uses it is also contemplated that where no excessive heating is encountered the coupling may be operated in this latter manner.

Upon now referring to Figure 5 it will be seen that the principle of operation of the embodiment of the invention illustrated in Figure 1 of the drawings is substantially similar to those prevailing in my prior application. However, in this instance I provide the fixed and radially disposed discharge outlet 76 with its plurality of spirally arranged ports 77 with which the apertures or perforations 80 of the internally disposed valve member 79 are adapted to register as the latter member is turned relative thereto. As indicated in this diagram, one of the intermediate ports 77 of the conduit 76 is shown as in register with an intermediate perforation of the tubular valve member 79 and when so positioned these members will serve to permit the escape of fluid from the vortex chamber at a level corresponding to the line B—B. In this way there will be provided a range of control for the level of fluid in the vortex chamber which will correspond substantially to the radial length of the fluid discharge conduit 76. When operating in this manner it will be seen that as the operating fluid is discharged through one or the other of the ports 77 of the discharge conduit 76 it will return to the reservoir 83 where it will be picked up by the pump 85 and delivered to the cooler 86 from which the fluid will then return via the pipe connection 87 to the interior of the vortex chamber at a point near the axis of rotation of the coupling.

In Figure 6 there is shown a diagrammatic illustration of one form of prior art coupling having a driving member 91 and a driven member 92 which form a vortex chamber 93. In this arrangement the vortex chamber is provided with a restricted outlet 94 for the continuous discharge of the operating fluid at the perimeter of the coupling. In principle the operation of this type of coupling contemplates a pumping of the operating fluid to the vortex chamber at a rate which will compensate for the discharge of fluid which is constantly taking place at the restricted outlet 94. In this particular showing the rate of flow is illustrated as sufficient to maintain a level of fluid in the vortex chamber which will correspond to the line C—C. With this form of coupling, if it should be desired to lower the centrifugal level of the fluid in the vortex chamber of coupling the rate of flow will be decreased until the desired level is obtained or contrariwise if the level of fluid in the vortex chamber 93 is to be raised the rate of flow of fluid to the coupling will be increased to a point in excess of the rate of discharge of fluid through the outlet 94 until the new level is obtained. In this way the operation of the coupling and consequently the slip between the driving member 91 and the driven member 92 may be regulated. The upstanding column, designated by the numeral 95, is added to represent a column of fluid which would be comparable to the pressure obtained in a feed pipe 96 which delivers fluid from a cooler 97. With this particular arrangement it will be seen that the maintenance of any particular level of operating fluid within the vortex chamber will be dependent upon a regulation of the fluid pressure producing means such as a pump 98 which will withdraw the operating fluid from a reservoir 99 into which it is discharged from the restricted outlet 94. With this latter or prior art form of coupling it will be seen that the rate of flow of the operating fluid through the vortex chamber will be restricted and determined by the size of the discharge outlet means 94 and therefore the circulation of an operating fluid for the purpose of maintaining a cooled condition of operation will be correspondingly restricted. But, as distinguished from this it will also be seen that with the arrangements contemplated by this invention, as illustrated in Figures 1 and 5 of the drawings, a constant quantity and a uniform flow of operating fluid may be maintained within the vortex chamber of the coupling and this at any desired level. The side of the discharge outlets provided by my particular level controlling means may be of any desired size and therefore the rate of flow of operating fluid through the vortex chamber may be maintained at any rate which will insure a uniform and practical temperature for the operating fluid with any degree of slip between driving and driven members.

While I have, for the sake of clearness and in order to disclose the invention so that the same can be readily understood, described and illustrated specific devices and arrangements, I desire to have it understood that this invention is not limited to the specific means disclosed, but may be embodied in other forms that will suggest themselves to persons skilled in the art. It is believed that this invention is new and all such changes as come within the scope of the appended claims are to be considered as part of this invention.

I claim:

1. A fluid level controlling valve for hydraulic couplings of the vortex chamber type, comprising an open ended fixed cylindrical valve member disposed radially with respect to the axis of the coupling, a fluid conduit extending from the outermost end of said valve member and communicating with the vortex chamber of the coupling at its outer perimeter, a second open ended cylindrical valve member mounted for rotation within said first valve member, one of said valve members having spaced fluid discharge ports disposed in a spiral line extending inwardly from said fluid conduit toward the axis of the coupling and the other of said valve members having a corresponding number of ports disposed in a straight line extending inwardly from said fluid conduit toward the axis of the coupling, and means for rotating said second valve member with respect to said fixed valve member to successively establish open fluid discharge ports along said fixed valve member inwardly toward the axis of the coupling while the coupling is in operation, whereby the point of discharge of fluid through a port of said fixed valve member will determine the amount and level of fluid centrifugally maintained in the vortex chamber of the coupling from zero to its maximum capacity.

2. A fluid level controlling valve for hydraulic couplings of the vortex chamber type, comprising an open ended fixed cylindrical valve member disposed radially with respect to the axis of the coupling, a fluid conducting conduit extending from the outermost open end of said fixed cylindrical valve member and communicating with the vortex chamber of the coupling at its outer perimeter, a second open ended cylindrical valve member mounted for rotation within said first valve member, said first valve member having spaced fluid discharge ports disposed in a spiral line extending inwardly from said fluid conducting conduit toward the axis of the coupling and said second valve member having a corresponding number of ports disposed in a straight line extending inwardly from said fluid conducting conduit toward the axis of the coupling, and means for rotating said second valve member with respect to said fixed valve member to successively open a discharge port of said fixed valve member inwardly toward the axis of the coupling while the coupling is in operation, whereby the point of discharge of fluid through said valve will determine the level of fluid centrifugally maintained in the vortex chamber of the coupling throughout the entire operating limits.

3. A fluid level controlling valve for hydraulic couplings of the vortex chamber type, comprising an open ended fixed cylindrical valve member disposed radially with respect to the axis of the coupling, a fluid directing conduit extending from the open end of said fixed valve member and communicating with the vortex chamber of the coupling at its outer perimeter, a second open ended cylindrical valve member mounted for rotation within said first valve member, said first valve member having two rows of spaced fluid discharge ports disposed in spiral lines extending inwardly from the outer end thereof toward the axis of said coupling and said second valve member having a corresponding number of ports arranged in two rows and disposed in straight lines extending inwardly from the outer end thereof toward the axis of the coupling, and means for rotating said second valve member with respect to said fixed valve member to successively open the spirally arranged discharge ports of said fixed valve member inwardly toward the axis of the coupling, whereby the point of discharge of fluid through said fixed valve member will determine the level of fluid centrifugally maintained in the coupling throughout the entire radial limits of the vortex chamber of the coupling.

4. A fluid level controlling valve for hydraulic couplings of the vortex chamber type, comprising an open ended fixed cylindrical valve member extending radially with respect to the axis of the coupling, a fluid directing conduit extending from the open end of said fixed valve member and communicating with the vortex chamber of the coupling at its outer perimeter, a second open ended cylindrical valve member mounted for rotation within said first valve member, said first valve member having two rows of spaced fluid discharge ports disposed in spiral lines extending inwardly from its outer end toward the axis of said coupling and said second valve member having a corresponding number of ports arranged in two rows extending therealong in straight lines inwardly toward the axis of the coupling, said two rows of spirally disposed fluid discharge ports of said first valve member being staggered with respect to the ports of said second valve member to provide a substantially continuous and radially variable fluid discharge outlet from the vortex chamber of the coupling as the two straight rows of ports are alternately brought into register therewith, and means for rotating said second valve member with respect to said fixed valve member to successively open the discharge ports of said fixed valve member inwardly toward the axis of the coupling, whereby the point of discharge of fluid through said fixed valve member may be adjusted to completely empty and/or determine the level of fluid centrifugally maintained in the vortex chamber of the coupling.

5. In a fluid level controlling means for variable speed hydraulic couplings of the vortex chamber type employing a constant flow of operating fluid therethrough, the combination of a housing member carried by one of the operating rotors of the coupling forming a chamber within which the other of said rotors operates, said housing member having conduit communicating with the vortex chamber of the coupling at its outer perimeter, an open ended cylindrical valve body member communicating with said conduit and extending radially inward with respect to the perimeter of the coupling, an open ended tubular valve member disposed within said valve body member communicating with the conduit of said housing member, said valve body member and said valve member respectively having a plurality of spaced fluid discharging ports formed therein along diverging lines extending inwardly from the open ends thereof, adapted and arranged to provide radially variable points of discharge for fluid flowing through said conduit from the vortex chamber of the coupling, and means for operating said valve member with respect to said valve body member while the coupling is in operation, whereby the level of operating fluid centrifugally maintained in said vortex chamber of the coupling may be varied from zero to its maximum capacity to disconnect and/or control the speed ratio between the driving and driven members of the coupling.

6. In a fluid level controlling means for hydraulic couplings of the vortex chamber type having a driving member and a driven member with a constant flow of operating fluid therebetween, the combination of a housing member carried by the driving member of the coupling forming a chamber in which the driven member operates, said housing member having a conduit communicating with the vortex chamber of the coupling at its outer perimeter, an elongated valve body member communicating at its outer end with said conduit and extending inwardly within the radial limits of the vortex chamber of the coupling, an open ended tubular valve member disposed within said valve body member also communicating with said conduit at its outer end, said valve body member and said valve member each having a plurality of spaced fluid discharge ports disposed along diverging lines extending inwardly toward the axis of the coupling adapted and arranged to provide a radially variable point of discharge for fluid flowing to said valve body member through said conduit from the vortex chamber of the coupling, and means for turning said valve member with respect to said valve body forming member while the coupling is in operation, whereby the level of fluid centrifugally maintained in the vortex chamber may be varied from zero to any desired degree to disconnect and/or control the speed ratio between the driving and driven members of the coupling.

References Cited in the file of this patent
UNITED STATES PATENTS

| | | |
|---|---|---|
| 2,143,565 | Minea | Jan. 10, 1939 |
| 2,557,894 | Siesel | June 19, 1951 |